United States Patent

Freeman

[15] 3,674,877

[45] July 4, 1972

[54] PESTICIDALLY ACTIVE COMPOUNDS AND COMPOSITIONS CONTAINING THEM

[72] Inventor: Peter Frank Hilary Freeman, Reading, England

[73] Assignee: Imperial Chemical Industries Limited, London, England

[22] Filed: June 2, 1970

[21] Appl. No.: 42,858

[52] U.S. Cl. .................................................. 424/263
[51] Int. Cl. .................................................. A01n 9/22
[58] Field of Search ............... 424/263; 260/294.8 G, 294.9

[56] References Cited

UNITED STATES PATENTS

| | | | |
|---|---|---|---|
| 2,932,647 | 4/1960 | Rockett | 260/294.8 |
| 3,284,293 | 11/1966 | Mohr et al. | 260/294.9 X |
| 3,468,895 | 9/1969 | Mohr et al. | 260/294.9 |
| 3,519,634 | 7/1970 | Mohr et al. | 260/294.8 |

*Primary Examiner*—Albert T. Meyers
*Assistant Examiner*—Doris J. Funderburk
*Attorney*—Cushman, Darby & Cushman

[57] ABSTRACT

Fungicidal and insecticidal compositions comprise as an active ingredient a compound of formula:

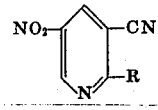

wherein R represents an atom of halogen, a hydroxy group or an ether derived therefrom, a mercapto group or a thioether derived therefrom, a sulphenylthio group, an unsubstituted or substituted amino group, or an N- containing heterocyclic group linked through the N- atom to the pyridine ring; or either (i) a quaternary salt thereof or (ii) an N-alkylated tautomer thereof.

4 Claims, No Drawings

PESTICIDALLY ACTIVE COMPOUNDS AND COMPOSITIONS CONTAINING THEM

This invention relates to pesticidal compositions, to new chemical compounds useful therein and to methods of making them, and to methods for combating plant pests.

The present invention provides a pesticidal composition comprising as an active ingredient a compound having the general formula:

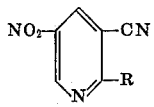

wherein R represents an atom of halogen, a hydroxy group and an ether derived therefrom, a mercapto group or a thioether derived therefrom, a sulphenylthio group, an unsubstituted or substituted amino group, or an N- containing heterocyclic group linked through the nitrogen atom to the pyridine ring;

or either a (i) quarternary slat thereof having the general formula:

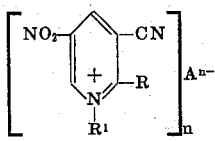

wherein R has any of the meanings hereinabove defined, $R^1$ represent a hydrocarbyl group, and $A^{n-}$ represents an anion of valency n, where n is an integer of from 1 to 3 inclusive;

or (ii) an N-alkylated tautomer thereof having the formula:

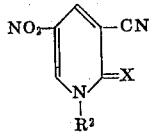

wherein $R^2$ represents a hydrocarbyl group, and X represents an atom of oxygen or sulphur.

In a preferred aspect the invention provides a pesticidal composition comprising as an active ingredient a compound having the general formula:

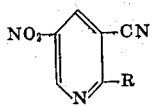

wherein R represents an atom of halogen, an unsubstituted or substituted hydrocarbylthio group, an unsubstituted or substituted amino group, an acylamino group, or an N- containing heterocyclic group linked through the nitrogen atom of the pyridine ring.

In an especially preferred aspect the invention provides a pesticidal composition comprising as an active ingredient a compound having the formula:

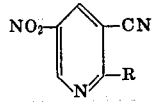

wherein R represents an atom of chlorine, or an alkylthio, arylthio, aralkylthio, alkarylthio, alkoxycarbonylalkylthio, amino, alkylamino, diakylamino, alkoxycarbonylalkylamino, cyanoalkylamino, arylamino, haloarylamino, benzamido, halobenzamido, or pyrrolidino group.

The term "pesticidal" as used in this specification and claims, does not include the ability to kill vegetation, i.e. herbicidal activity.

Specific compounds useful as active ingredients of the invention compositions are listed in Table I below, and they all conform to the general formula:

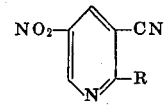

Table I lists the nature of the substituent designated R and a melting point expressed in degrees centigrade is given for each compound.

TABLE I

| Compound Number | R | Melting point (° C.) |
|---|---|---|
| 1 | Cl | 118–119 |
| 2 | $NHC_2H_5$ | 152–154 |
| 3 | $NHCH_3$ | 173–175 |
| 4 | $NH_2$ | 242–244 |
| 5 | $N(CH_3)_2$ | 161–162 |
| 6 | $N(C_2H_5)_2$ | 79–80 |
| 7 | $NHCH_2COOC_2H_5$ | 172–129 |
| 8 | $NHC_6H_5$ | 175–176 |
| 9 | —N⟨(pyrrolidino) | 155–157 |
| 10 | —NH—C₆H₄(Cl) (ortho) | 134–136 |
| 11 | —NH—C₆H₄(Cl) (meta) | 183–184 |
| 12 | —NH—C₆H₄(Cl) (para) | 252–253 |
| 13 | —NH—CO—C₆H₅ | 222–4 |
| 14 | —NH—CO—C₆H₄—Cl | 236 |
| 15 | —NH—CH₂—CH₂—CN | 193–4 |
| 16 | —SCH(CH₃)₂ | 107–8 |
| 17 | —SCH₂CH₃ | 94–5 |
| 18 | —S(CH₂)₃CH₃ | 71–3 |
| 19 | —SCH₂CO₂C₂H₅ | 100–1 |
| 20 | —SCH₂—C₆H₅ | 128–9 |
| 21 | —S—C₆H₄—CH₃ (ortho) | 115–6 |
| 22 | —S—C₆H₄—CH₃ (para) | 123–4 |
| 23 | —SCH₃ | 141–2 |
| 24 | —SH | 217–8 |
| 25 | —S—S—(pyridyl NC,NO₂) | 248–9 |
| 26 | —S—SCH₂—C₆H₅ | 140 |
| 27 | —O—C₆H₄—Cl | 138–140 |
| 28 | —O—C₆H₄—Cl | 136–138 |
| 29 | —O—C₆H₄(Cl) | 111–113 |

Further specific compounds within the invention have the structures and melting points given in Table 2 below

TABLE 2

| Compound Number | R | Melting point (° C.) |
|---|---|---|
| 30 | 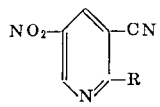 | 166 |
| 31 | NO₂—⟨pyridinium⟩—CN, —Cl BF₄⁻, N-C₂H₅ | 299 |

The compounds of Tables I and 2 except Compound No. 1 have not hitherto been described and are new compounds.

Accordingly, in a further aspect, the invention provides the compounds numbered from 2 to 29 inclusive in Table I and the compounds numbered 30 and 31 in Table 2.

The invention compounds of formula:

$$NO_2-\text{(pyridine)}-CN, -R$$

wherein R has any of the meanings hereinbefore defined, may be prepared by bringing into reaction a 2-halo-5-nitro-nicotinonitrile, e.g. the 2-chloro derivative, and the appropriate amine, or alkali metal salt of the thiol, or of the phenol. The nitrile is preferably dissolved in an organic solvent, e.g. ethanol, and the amine added at room temperature. The resultant solution is then heated under reflux for 2 hours and then cooled to 0° C to obtain crystals of the product, which may then be recrystallized, e.g. using ethyl alcohol, if desired.

The compositions and compounds of the invention are active against soil-borne fungal diseases, including the following:

*Pythium ultimum* (damping off) on peas
*Fusarium culmorum* (seedling blight) or wheat
*Rhizoctonia solani* (sore shin) on cotton
*Verticillium albo-atrum* (wilt) on cotton Compound No. 1 of Table I is particularly useful against soil-borne fungal diseases especially the first three of those named above.

The compositions of the invention additionally possess activity against a variety of foliar-borne fungal diseases including, for example, the following specific diseases:

*Puccinia recondita* (rust) on wheat
*Podosphaera leucotricha* (powdery mildew) on apples
*Phytophthora infestans* (late blight) on tomatoes
*Plasmopara viticola* (downy mildew) on vines
*Sphaerotheca fuliginea* (powdery mildew) on cucumber
*Uncinula necator* (powdery mildew) on vines
*Piricularia oryzae* (blast) on rice
*Venturia inaequalis* (scab) on apples Some of the invention compounds also display insecticidal activity. For example at 100 ppm. compound No. 9 gave a 100 percent kill of aphids (*Aphis fabae* and *Megoura viciae*) at 125 ppm. Compounds No. 2, 7 and 13 exhibited a chemosterilant effect against red spiders.

A particularly useful feature of the activity of the invention compounds is their ability to act individually as systemic pesticides, that is to say, their ability to move in a plant to combat an infection or infestation thereon remote from a site of initial application of a compound. Thus a compound of the invention, or a composition containing the same, may be applied to the soil surrounding the roots of a plant and taken up by the plant through its roots to combat pests on the plant.

In use, the invention compounds, or compositions containing them, may be applied in a variety of ways. Thus their application can suitably be directed onto the foliage of the plant or to infected and/or infested areas thereof; alternatively the soil surrounding the plant can be treated with the invention compounds or compositions containing them. If desired the seeds themselves can be similarly treated.

According to a further feature therefore we provide a method of combating undesired pests on plants which comprises applying to the locus of the plant a composition or compound as hereinbefore defined.

In a further aspect the invention provides a method of combating pests on plants which comprises applying to the plants or to seeds thereof a composition or compound as hereinbefore defined. The invention further includes a method of treating agricultural soil which comprises applying to the soil a composition or compound as hereinbefore defined.

In yet a further aspect the invention includes a method of combating pests which comprises applying to the pests or to a pest habitat a composition or compound as hereinbefore defined.

The compositions and compounds of the invention may be used for agricultural or horticultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example, kaolin, bentonite, kieselguhr, dolomite, calcium carbonate, talc, powdered magnesia, Fuller's earth, gypsum, Hewitt's earth, diatomaceous earth and China clay. Compositions for dressing seed, for example, may comprise an agent assisting the adhesion of the composition to the seed, for example, a mineral oil.

The composition may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecyl-benzenesulphonate, sodium, calcium or ammonium lignosulphonate, butylnaphthalene sulphonate, and a mixture of the sodium slats of diisopropyl- and triisopropyl-naphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins.

Suitable suspending agents are, for example, hydrophilic colloids, for example polyvinylpyrrolidone and sodium carboxymethylcellulose, and the vegetable gums, for example gum acacia and gum tragacanth.

The aqueous solutions dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compositions of the invention may also be formulated as capsules or microcapsules containing either the active ingredient itself, or a composition containing the active ingredient, and prepared by any of the known encapsulation or microencapsulation techniques.

The compositions to be used as sprays may also be in the Form of aerosols wherein the formulation is held in a container under pressure in the presence of a propellant such as fluorotrichloromethane or dichlordifluoromethane.

By the inclusion of suitable additives, for example, for improving the distribution, adhesive power and resistance to rain on treated surfaces, the different compositions can be better adapted for the various uses for which they are intended.

The compositions and compounds of this invention may also be conveniently formulated by admixing them with fertilizers. A preferred composition of this type comprises granules of fertilizer material incorporating, for example coated with, a composition or compound of the invention. The fertilizer material may, for example, comprise nitrogen or phosphate-containing substances.

In yet a further aspect of the invention, therefore, we provide a pesticidal composition or compound as hereinbefore defined in admixture with a fertilizer material.

The compositions which are to be used in the form of aqueous dispersions or emulsions are generally supplied in the form of a concentrate containing a high proportion of the active ingredient or ingredients, the said concentrate to be diluted with water before use.

These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85 percent by weight of the active ingredient or ingredients and generally from 25–60 percent by weight of the active ingredient or ingredients. When diluted to form aqueous preparations, such preparations may contain varying amounts of the active ingredient or ingredients depending upon the purpose for which they are to be used, but an aqueous preparation containing between 0.001 percent and 1.0 percent by weight of active ingredient or ingredients may be used.

It is to be understood that the pesticidal compositions of this invention may comprise one or more other active compounds having biological activity, beyond those recited above. The invention is illustrated, but not limited by the following examples.

EXAMPLE 1

This example illustrates an atomizable fluid comprising a mixture consisting of 25 percent by weight of Compound No. 1 of Table I and 75 percent by weight of xylene.

EXAMPLE 2

This example illustrates a dusting powder which may be applied directly to plants or other surfaces and comprises 1 percent by weight of Compound No. 1 of Table I and 99 percent by weight of talc.

EXAMPLE 3

25 parts by weight of the product described in Example 12, 65 parts by weight of xylene, and 10 parts of an alkyl aryl polyether alcohol ("Triton" X-100; "Triton" is a Trade Mark) were mixed in a suitable mixer. There was thus obtained an emulsion concentrate which can be mixed with water to produce an emulsion suitable for use in agricultural applications

EXAMPLE 4

5 parts by weight of the product described in Example 12 were thoroughly mixed in a suitable mixer with 95 parts by weight of talc. There was thus obtained a dusting powder.

EXAMPLE 5

10 parts by weight of the product described in Example 12, 10 parts of an ethylene oxide-octylphenol condensate ("Lissapol" NX; "Lissapol" is a Trade Mark) and 80 parts by weight of diacetone alcohol were thoroughly mixed. There was thus obtained a concentrate which, on mixing with water, gave an aqueous dispersion suitable for application as a spray in the control of pests.

EXAMPLE 6

This example illustrates a concentrated liquid formulation in the form of an emulsion. The ingredients listed below were mixed together in the stated proportions and the whole stirred until the constituents were dispersed.

| | % wt. |
|---|---|
| Compound No. 1 (Table I) | 20 |
| 'LUBROL' | |
| ('Lubrol' is a Trademark) | 17 |
| Calcium dodecylbenzenesulphonate | 3 |
| Ethylene dichloride | 45 |
| 'AROMASOL' H | |
| ('Aromasol' is a Trademark) | 15 |
| Total | 100% |

EXAMPLE 7

The ingredients listed below were ground together in the proportions stated to produce a powdered mixture readily dispersible in liquids.

| | % wt. |
|---|---|
| Compound No. 1 (Table I) | 50 |
| Dispersol T | |
| ("Dispersol" is a Trademark) | 5 |
| China clay | 45 |
| Total | 100% |

EXAMPLE 8

A composition in the form of grains readily dispersible in a liquid (for example, water) was prepared by grinding together the first four of the ingredients listed below in the presence of water and then the sodium acetate was mixed in. The admixture was dried and passed through a British Standard mesh sieve, size 44–100 to obtain the desired size of grains.

| | % wt. |
|---|---|
| Compound No. 1 (Table I) | 50 |
| Dispersol T | 12.5 |
| Calcium lignosulphonate | 5 |
| Sodium dodecylbenzenesulphonate | 12.5 |
| Sodium acetate | 20 |
| Total | 100% |

EXAMPLE 9

A composition suitable for use as a seed dressing was prepared by mixing all three of the ingredients set out below in the proportions stated.

| | % wt. |
|---|---|
| Compound No. 1 (Table I) | 80 |
| Mineral Oil | 2 |
| China clay | 18 |
| Total | 100% |

EXAMPLE 10

A granular composition was prepared by dissolving the active ingredient in a solvent, spraying the solution obtained onto the granules of pumice and allowing the solvent to evaporate.

% wt.

|                              | %wt. |
|------------------------------|------|
| Compound No. 1 (Table I)     | 5    |
| Pumice Granules              | 95   |
| Total                        | 100% |

EXAMPLE 11

An aqueous dispersion formulation was prepared by mixing and grinding the ingredients recited below in the proportions stated.

|                              | % wt. |
|------------------------------|-------|
| Compound No. 1 (Table I)     | 40    |
| Calcium lignosulphonate      | 10    |
| Water                        | 50    |
| Total                        | 100%  |

The following constitutes an explanation of the compositions or substances represented by the various trade marks and trade names referred to in the foregoing examples.

| "LUBROL" L     | is a condensate of nonyl phenol with ethylene oxide. |
| "AROMASOL" H   | is a solvent mixture of alkylbenzenes. |
| "DISPERSOL" T  | is a mixture of sodium sulphate and a condensate of formaldehyde with the sodium salt of naphthalene sulphonic acid. |
| "LUBROL" APN 5 | is a condensate of nonyl phenol with naphthalene oxide. |
| "LISSAPOL" NX  | is a condensate of nonyl phenol with ethylene oxide. |

EXAMPLE 12

This example illustrates the preparation of the compound having the structural formula:

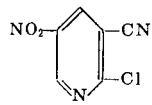

(Compound no. 1 (Table I))

3-cyano-5-nitro-2-pyridone (16.5 g.) was heated under reflux for 3 hours with phosphorus pentachloride (41.6 g.) and phosphorus oxychloride (30 cc.). The solvents were then removed in vacuo and the residue was cooled on ice whereafter small portions were added to ice-cold water (100 cc.). Concentrated sodium hydroxide was then added with cooling to bring the pH to 6. The precipitated material thereby obtained was filtered off and air-dried. It was recrystallized using aqueous ethanol; m.p. 118°–119° C.

The compound having the formula:

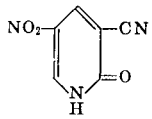

used in the above method was prepared as follows:

Benzyl trimethyl ammonium hydroxide (4 cc of a 40 percent aqueous solution) was added to a well stirred solution of sodium nitromalondialdehyde (31.4 g.) and cyanoacetamide (16.4 g.) in water (400 ml.) at 20° C. The solution became deep red and set to a mass of find needles as the temperature was allowed to rise to 30° C in the following 15 minutes. It was allowed to stand for a further 5 minutes and then cooled to 5° C when it was filtered at the pump. The crude yellow solid was dissolved in water (200 ml.) at 75° C and treated with concentrated hydrochloric acid (20 ml.) with vigorous stirring. A pale yellow precipitate formed. The mixture was cooled to 5° C and was filtered on a chilled Buchner flask. It was air-dried.

EXAMPLE 13

This example illustrates the preparation of the compound having the structural formula:

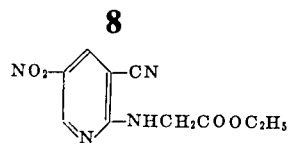

(Compound No. 7 of Table I)

2-chloro-3-cyano-5-nitropyridine (2.5 g.), glycine ethyl ester hydrochloride (2.0 g.) and sodium acetate (2.3 g.) were mixed, dissolved in aqueous ethanol (100 cc.) and the solution heated under reflux for 2 hours. The solvent was then removed in vacuo and the residue dissolved in hot methanol (150 cc. CH₃OH plus 80 cc. hot water), filtered and cooled to obtain pure crystals, m.p. 127°–129° C.

EXAMPLE 14

By a procedure similar to that illustrated in Example 13 above but replacing the glycine ester with the appropriate amine the preparation of the following compounds was effected: Compounds Nos. 2 to 6 inclusive and 8 to 12 inclusive of Table I.

EXAMPLE 15

This example illustrates a general procedure for the preparation of a compound of the general formula:

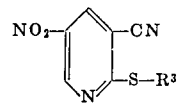

wherein R³ represents an alkyl, aryl, alkaryl, or aralkyl group.

To the appropriate thiol (0.025 mole) in acetone (40 ml.) was added potassium carbonate (10 percent excess). The mixture was stirred under nitrogen at 30°–35° C for half an hour. Compound No. 1 (Table I) (0.25 mole; prepared by the method of Example 12 above) in acetone (50 ml.) was added portion wise and the mixture refluxed for 2 hours under nitrogen. The solution was cooled, filtered and the solvent stripped off to leave the product which was recrystallized from methanol or ethanol.

By this procedure the preparation of the following compounds was effected: Compounds Nos. 16 to 18 inclusive and 20 to 23 inclusive of Table I).

EXAMPLE 16

This example illustrates the preparation of 2-carbethoxymethylthio-5-nicotinonitrile (Compound No. 19, Table I) having the structure:

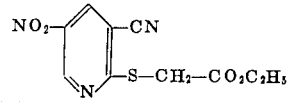

To ethyl thioglycollate (0.025 mole) in ethanol (100 ml.) was added sodium (10 percent excess) in ethanol (100 ml.). The mixture was stirred under nitrogen at room temperature for half an hour and the ethanol stripped off. To the resulting golden oil (ethyl thioglycollate sodium salt), partially dissolved in toluene (100 ml.), was added portion wise Compound No. 1 (Table I) (0.025 mole) in toluene (100 ml.) and the mixture refluxed for 3 hours under nitrogen. The solution was cooled, filtered and the solvent stripped off to leave the product which was recrystallized from ethanol to give yellow needles, m.p. 100°–1° C.

EXAMPLE 17

This example illustrates the preparation of Compound No. 24 of Table I which may be regarded as having two possible tautomeric structures thus:

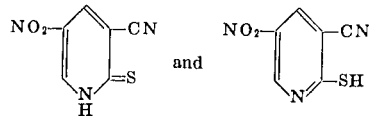

Mucobromic acid (258 g.) was converted to sodium nitromalondialdehyde, by the method recited in "Organic Syntheses" Coll. vol. IV, p 844, published by J. Wiley & Sons (New York). The moist cake was dissolved in warm water (1 liter) with cyanothioacetamide (39.2 g.) and 8 mls. of Triton B (trimethylbenzylammonium hydroxide, technical) added with vigorous stirring. A temperature rise of 2½° C was noted in half an hour while solid formed. The solution was cooled to 5° C and the solid filtered off and dissolved in warm water (400 ml.). Concentrated HCl (40 mls.) was added with stirring and an immediate orange mass formed that turned yellowish green on complete addition of the acid. The product was kept in the cold over night and the solid filtered off and boiled with water (500 ml.). When cold the final product was filtered off and recrystallized from water to give reddish brown needles, m.p. 217°–218° C (decomposition).

EXAMPLE 18

This example illustrates the preparation of bis(3-cyano-5-nitropyrid-2-yl) disulphide (Compound No. 25, Table I) having the formula:

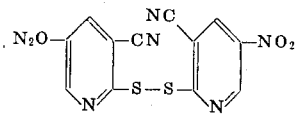

5 g. of the compound obtained in Example 17 above, was added to a solution of sodium hydroxide (1.3 g.) in water (150 ml.) and stirred until complete solution had occurred. To this mixture was then added dropwise a solution of iodine (4 g.) in ethanol (25 ml.). When the addition was complete the precipitate was collected by filtration washed with cold aqueous alcohol, and recrystallized from benzene to yield a light brown product, m.p. 248–9° C.

EXAMPLE 19

This example illustrates the preparation of benzyl 3-cyano-5-nitro-pyrid-2-yl disulphide (Compound No. 26, Table I) having the formula:

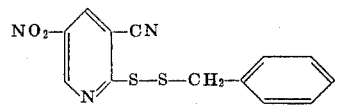

To N-chlorosuccinimide (0.0125 mole) in dry benzene (50 ml.) was added benzyl mercaptan (0.0125 mole) in benzene (25 ml.) with the temperature kept between 0° and 10° C. The mixture was stirred for half an hour under nitrogen and filtered. The filtrate was added to the product of Example 17 (0.0125 mole) in benzene (50 ml.), stirred at room temperature under nitrogen for 1 hour and refluxed for a further hour. When cold the solvent was stripped off and the solid remaining dissolved in chloroform (250 mls.). This was washed with equal volumes of 5 percent NaOH solution until the aqueous layer was a pale yellow and then dried over CaCl$_2$. The solvent was stripped off and the product recrystallized from ethanol to give yellow crystals, m.p. 140° C.

EXAMPLE 20

This example illustrates the preparation of 2-amino-3-cyano-5-nitropyridine (Compound No. 4, Table I) having the formula:

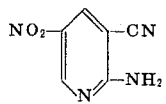

Compound No. 1 (Table I) (0.1 mole) and ammonia solution (s.g. 0.9, 0.3 mole) in ethanol (400 mls.) was refluxed for 2 hours with continuous stirring. The solution was cooled and the solid deposited washed with water and dried, m.p. 255–6°.

EXAMPLE 21

This example illustrates the preparation of 2-benzamido-5-nitronicotinonitrile (Compound No. 13, Table I) having the formula:

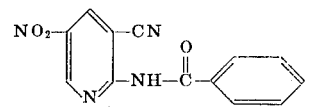

A mixture of the compound of Example 20 (0.0125 mole) and benzoyl chloride (0.0125 mole) in pyridine (100 ml.) was refluxed for 18 hours. The pyridine was stripped off and the solid remaining shaken with water (250 mls.) and recrystallized from ethanol to give brown needles, m.p. 224–5° C.

EXAMPLE 22

This example illustrates the preparation of 2(4-chlorobenzamido)-5-nitronicotinonitrile (Compound No. 14, Table I) having the formula:

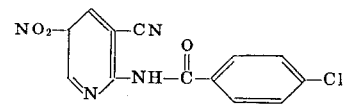

The procedure of Example 21 was followed except that refluxing continued for 37 hours and p-chlorobenzoyl chloride was used in place of benzoyl chloride. The product has m.p. 236° C.

EXAMPLE 23

This example illustrates the preparation of 3-cyano-1-methyl-5-nitro-pyrid-2-one (Compound No. 30, Table 2) having the formula:

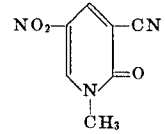

Mucobromic acid (129 g.) was converted into sodium nitromalondialdehyde. The moist cake was dissolved in water (200 mls.) at room temperature with N-methylcyanoacetamide (8.2 g.) and 2mls. of Triton B added with stirring. The solution turned deep red with a temperature rise over 15 minutes of 5° C. The solution was acidified with concentrated HCl to give a yellow solid that was recrystallized from water to give colorless needles, m.p. 166° C.

EXAMPLE 24

This example illustrates the preparation of 2-chloro-3-cyano-1-ethyl-5-nitropyridinium fluoroborate (Compound No. 31, Table 2) having the formula:

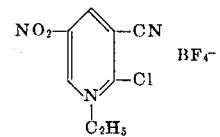

Compound No. 1 (Table 1) (0.025 mole) and freshly prepared triethyl oxonium fluoborate (0.025 mole) was dissolved in nitromethane (100 ml.). The solvent was evaporated under reduced pressure at approximately 50° C. CH$_2$Cl$_2$ (100 mls.) was added to the residue and heated for one-fourth hour on the steam bath. When the volume of solvent was reduced to about 10 mls. the solution was cooled and a white solid separated out. This was recrystallized from acetonitrile to give colorless crystals, m.p. 229° C. (decomposition).

EXAMPLE 25

Compositions according to the invention were made up and tested against various soil-borne fungal diseases, and the procedure used in these tests, and the results obtained in each of them, are shown hereinafter.

Test against Pythium ultimum — Procedure

Approximately one gram portions of culture of *Pythium ultimum* maintained on 2 percent malt agar test-tube slopes at 20° C are transferred to about 400 grams of sterilized soil containing 5 percent maize meal in a half pint bottle. After 10 to 14 days the inoculated soil is mixed with sterile John Innes seed compost at a rate of 2 bottles to 3½ buckets of 2 gallons capacity. The mixture is moistened and covered and after three days is used as follows. Approximately 100 grams of the mixture is placed into a fiber pot and 10 pea seeds coated 2 days beforehand with chemical under test at the rate of 500 ppm. are sprinkled on the surface of the soil. Another 100 grams of the mixed soil is then placed on top of the seeds and the pot is kept in the greenhouse at between 16° and 22° C. A first count of emergent seedlings is made after 10 days and another week is allowed to lapse before a second visual assessment takes place by pulling the seedlings up and inspecting their roots. Six replicates are conducted and observations are made of the number of healthy seedlings and the number of unhealthy seedlings. The number of ungerminated seeds is 10 less the number of emergent seedlings. Controls wherein untreated seed is used, and also standards wherein seed treated with Thiram are used, are simultaneously carried out. Calculations are then made whereby a grading is obtained for disease control.

Test against Fusarium culmorum — Procedure

In the test John Innes seeding compost is admixed with a culture of *Fusarium culmorum* grown on an admixture of soil and cornmeal and the entire mixture then wrapped in brown paper and incubated in the glasshouse for 48 hours. The incubated soil is placed in pots; then seeds (20 per pot) treated with china clay compositions containing the invention compound in concentration of 1000 parts per million are sown in the pots. Seeds treated with "AGROSAN" (Trade Mark) mercury seed dressing are used as a standard. Counts of the seedlings emergent 10 days after sowing are taken and the results converted to a percentage of the seeds sown. Disease assessments are made 16 days after sowing.

Test against Rhizoctonia solani — Procedure

In the test an inoculum of *Rhizoctonia solani* is added to a partially sterilized loam soil, to provide the latter with a 1 percent w/w content of the inoculum. The loam soil is then allowed to stand for one week so as to be completely colonized by the disease. The compound is then admixed with the loam soil at a rate of 100 parts per million parts of soil (by weight). After standing for 4 days to allow the chemical to take effect plastic pots are half-filled with untreated, partially sterilized, loam soil and cotton seeds sown on the surface thereof, whereafter the pots are topped up with the treated loam soil. A control experiment is conducted with P.C.N.B. (pentachloronitrobenzene). The pots are then inspected and assessed 13 days later for disease.

In Table 3 below the figures in the right hand column are the numbers accorded to the compounds (see Tables 1 and 2 above) tested and the grading scale number is given beneath in parenthesis. The particular disease is represented in the left hand column and the concentration of the compound used is in brackets beneath the disease name.

The results are expressed as a grading as follows:

| Grading | Significance of Grading |
| --- | --- |
| 0 | No activity or up to 20% of the disease control given by standard. |
| 1 | 20–75% of the disease control given by standard. |
| 2 | 75–99% of the disease control given by standard. |
| 3 | Degree of control equal to, or better than, standard. |

TABLE 3

| Disease | Compound number and grading |
| --- | --- |
| *Pythium ultimum* (500 p.p.m.) | 1(3) |
| *Fusarium culmorum* (1,000 p.p.m.) | 5(1), 8(3), 12(1), 14(1), 16(1), 19(1), 21(1) |
| *Rhizoctonia solani* (100 p.p.m.) | 1(3), 6(1), 7(1), 9(1), 10(1), 11(1), 18(1) |
| *Verticillium alboatrum* (100 p.p.m.) | 30(2) |

EXAMPLE 26

Compositions according to the invention were made up in the following manner and tested in different ways against various foliar-borne fungal diseases. The procedure adopted for each test is described below.

An aqueous solution or suspension containing 500 parts per million (ppm.) of the compound under test and suitable either for drenching the soil surrounding growing plants, or for spraying onto the leaves of cucumber, vine or apple plants is obtained by adding water to a solution of the compound (200 mg.) in acetone (1 ml.) until the total volume of the mixture is 400 ml. An aqueous solution or suspension suitable for spraying onto the leaves of wheat, barley or rice plants is prepared similarly, but instead of water, a 0.1 percent volume/volume aqueous solution of the polyoxyethylenesorbitan monolaurate wetting agent, "Tween" 20, is used ("Tween" is a Trade Mark).

A. Spray-applied Protectant Test

A suspension or solution containing 500 ppm. of the active compound was sprayed directly onto the leaves of plants, a wetting agent being used when the plant was wheat, barley or rice. After 24 hours the plant was inoculated with the fungus under test and after a further suitable period of time (Time Interval A — see Table 4 below) depending upon the particular plant and fungus, the extent of infection was assessed visually.

B. Drench-applied Protectant Test

A suspension or solution containing 500 ppm. of the active compound was applied to the soil surrounding the plant under test and 48 hours later the plant was inoculated with the fungus. The extent of infection was assessed visually after a period of time (Time Interval B — see Table 4 below) depending upon the plant and the fungus.

C. Spray-applied Eradicant Test

The plants were inoculated with the fungus under test, and 24 hours later the liquid preparation containing 500 ppm. of the active compound was sprayed onto the leaves of the plants as described under A above. After a further period of time (Time Interval C see Table 4 below), again depending upon the particular plant and fungus, the extent of the infection was assessed visually.

The results of these tests are expressed in Table 5, which follows Table 4 below, as a grading giving the percentage amount of disease:

| Grading | Percentage Amount of Disease |
| --- | --- |
| 2 | 61 to 100 |
| 1 | 26 to 60 |
| 2 | 6 to 25 |
| 3 | 0 to 5 |

TABLE 4

| Disease and Plant | Time interval A and B (days) | Time interval C (days) |
|---|---|---|
| Puccinia recondita (wheat) | 10 | — |
| Phytophthora infestans (tomato) | 3 | — |
| Sphaerotheca fuliginea (cucumber) | 7 | 6 |
| Podosphaera leucotricha (apple) | 10 | 9 |
| Uncinula necator (vine) | 10 | 9 |
| Plasmopara viticola (vine) | 7 | — |
| Piricularia oryzae (rice) | 7 | 6 |
| Venturia inaequalis (apple) | 21 | 20 |

TABLE 5

| Disease | Spray applied protectant test (Test A) | Root drench protectant test (Test B) | Spray applied eradicant test (Test C) |
|---|---|---|---|
| Puccinia recondita (wheat) | 13(2), 27(2), 30(1) | 3(1), 4(1) | |
| Phytophthora infestans (tomato) | 2(1), 16(3), 23(3) | 2(2), 3(3), 28(1) | |
| Sphaerotheca fuliginea (cucumber) | 2(2), 3(2), 15(1), 29(1) | 2(3) | |
| Plasmopara viticola (vine) | 14(3), 16(2), 19(2), 20(1), 22(2), 24(2), 25(2) | | 1(2), 2(1), 3(1) |
| Uncinula necator (vine) | 13(3), 14(2), 23(3), 31(3) | | |
| Piricularia oryzae (rice) | 1(1), 3(1), 14(1), 29(2) | | |
| Podosphaera leucotricha (apples) | 13(1), 14(1), 15(3), 16(2) | | |
| Venturia inaequalis (apple) | 20(3), 23(2) | | |

I claim:

1. A fungicidal composition comprising as an active ingredient a fungicidally effective amount of a compound of the formula:

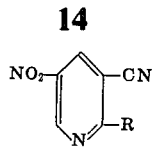

wherein R represents a member selected from the group consisting of alkylthio wherein the alkyl has one–three carbon atoms, benzylthio, tolylthio, carbethoxymethylthio, benzylsulphenylthio, and 3-cyano-5-nitropyrid-2-ylsulphenylthio, together with a carrier therefor.

2. A method of combating undesired plant fungi which comprises applying to the locus of the plants a fungicidally effective amount of a compound of the formula:

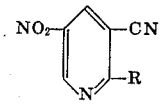

wherein R represents a member selected from the group consisting of alkylthio wherein the alkyl has one–three carbon atoms, benzylthio, tolylthio, carbethoxymethylthio, benzylsulphenylthio, and 3-cyano-5-nitropyrid-2-ylsulphenylthio.

3. The method of claim 2 which comprises applying to a member selected from the group consisting of a plant and the seed of a plant, a fungicidally effective amount of said compound.

4. The method of claim 3 which comprises applying to a member of the group consisting of the fungi and the fungi habitat a fungicidally effective amount of said compound.

* * * * *